US00RE34040E

United States Patent [19]

Rains

[11] E Patent Number: Re. 34,040

[45] Reissued Date of Patent: Aug. 25, 1992

[54] HANDBRAKE OPERATING LINKAGE FOR MULTI-UNIT RAIL CARS

[75] Inventor: Marvin G. Rains, Tualatin, Oreg.

[73] Assignee: Gunderson, Inc., Portland, Oreg.

[21] Appl. No.: 421,839

[22] Filed: Oct. 13, 1989

Related U.S. Patent Documents

Reissue of:

[64] Patent No.: 4,805,743
Issued: Feb. 21, 1989
Appl. No.: 136,189
Filed: Dec. 15, 1987

[51] Int. Cl.[5] ..... B61H 13/00

[52] U.S. Cl. ..... 188/47; 74/505; 74/506; 188/33; 188/52; 188/107; 188/198

[58] Field of Search ..... 188/47, 52-55, 188/106, 107, 105, 193, 197-203, 217, 219.1, 34, 49-51, 204, 347, 348, 351, 33; 74/505, 506, 89.22, 89.21, 501 R

[56] References Cited

U.S. PATENT DOCUMENTS

| | | | |
|---|---|---|---|
| 1,177,618 | 4/1916 | Gregg | 188/47 |
| 1,284,205 | 11/1918 | Marky | 188/47 X |
| 1,518,724 | 12/1924 | Wrigley | 74/506 |
| 1,607,556 | 11/1926 | Neubert | 188/47 |
| 1,614,419 | 1/1927 | Brewster | 74/506 |
| 1,652,758 | 12/1927 | Camp | 74/506 |
| 1,652,759 | 12/1927 | Camp | 74/506 |
| 1,655,322 | 1/1928 | Mann | 74/506 |
| 1,662,417 | 3/1928 | Cook et al. | 74/506 |
| 1,746,322 | 2/1930 | Taylor | 74/506 |
| 1,877,354 | 9/1932 | Miner | 74/506 |
| 1,929,767 | 10/1933 | Baselt | 188/47 X |
| 2,123,584 | 7/1938 | Fuchs | 74/505 |
| 2,363,393 | 11/1944 | Burnett | 74/505 |
| 2,686,575 | 8/1954 | Bunker | 188/107 |
| 2,762,459 | 9/1956 | Flowers | 188/47 |
| 3,036,666 | 5/1962 | Schlosser, Jr. | 188/107 X |
| 3,294,035 | 12/1966 | Enochian | 188/107 X |
| 3,396,603 | 8/1968 | Bezlaj et al. | 74/506 |
| 3,484,815 | 12/1969 | Yearpock | 74/505 |
| 3,998,430 | 12/1976 | Weseloh | 74/505 |
| 4,102,212 | 7/1978 | Hackbarth et al. | 74/89.22 |
| 4,182,197 | 1/1980 | Olander | 74/505 |
| 4,236,424 | 12/1980 | Kanjo et al. | 74/505 |
| 4,312,428 | 1/1982 | Beacon | 188/52 |
| 4,346,790 | 8/1982 | Morrison et al. | 188/47 |
| 4,422,532 | 12/1983 | Cordani et al. | 188/52 X |
| 4,463,966 | 8/1984 | Stoddard | 280/442 |
| 4,479,567 | 10/1984 | Pearson | 188/47 |
| 4,489,814 | 12/1984 | Pearson | 188/47 X |
| 4,508,197 | 4/1985 | Biegel | 188/198 X |
| 4,805,743 | 2/1989 | Rains | 188/107 X |
| 4,905,795 | 3/1990 | Rains | 188/107 X |

*Primary Examiner*—Douglas C. Butler
*Attorney, Agent, or Firm*—Chernoff, Vilhauer, McClung & Stenzel

[57] ABSTRACT

An improved single manual brake operating system for connecting the brake equipment of a plurality of wheeled railroad freight car trucks. The system provides for initial rapid takeup of slack in the linkages interconnecting the braking mechanisms for several trucks and thereafter supplies force with a greater mechanical advantage as the brake shoes are forced against the wheels of the railway car. This variably applied take-up force is accomplished using a system of noncircular sheaves to which flexible portions of the handbrake operating linkage are attached in such a manner that initial rotation of the take-up sheave is accomplished through a relatively long effective axis of rotation of the sheave and thereafter through a shorter effective axis of rotation.

12 Claims, 4 Drawing Sheets

HANDBRAKE OPERATING LINKAGE FOR MULTI-UNIT RAIL CARS

Matter enclosed in heavy brackets [ ] appears in the original patent but forms no part of this reissue specification; matter printed in italics indicates the additions made by reissue.

BACKGROUND OF THE INVENTION

The present invention relates to improvements in handbrake operating linkages for use on railroad cars, and particularly to such linkages for a multi-unit articulated railway car.

Safety regulations applicable to railroad cars require the ability to apply brakes manually to at least half of the axles of each car, with ample braking effect. Preferably, application or release of the brakes of all of the manually braked wheels should be possible from a single operator position such as a hand wheel or equivalent mechanism located at one end of a car. It should be possible for brakes to be applied manually in a short time, but it must also be possible for a single person to apply force manually to the brake shoes to grip all the affected wheels with sufficient braking effect. Further, because railroad cars on which such braking systems are installed are intended to carry a maximum load of stacked rectangular cargo containers, only a limited amount of space is available to locate the brake operating linkages, typically along one side of each car unit.

In a multi-unit articulated freight car the several units, and their wheeled trucks, all pivot with respect to one another as the car negotiates uneveness or curves in the track. A certain amount of slack and freedom of movement must be provided in the manual brake operating mechanisms and linkages, then, to prevent application of the brake shoes from occurring purely as an unwanted result of the relative movement between the trucks and units of the multi-unit car. The amount of such slackness and freedom of movement of the brake applying linkages should be kept as small as possible, in order to minimize the time and effort necessary to take up such slack preliminary to bringing the brake shoes forcefully into braking contact with the surfaces of the wheels on which they must press to create a braking force.

Because of the length of multi-unit articulated cars, which is considerably greater than the length of non-articulated cars, and because of the need for some linkages spanning the spaces between car units to be offset from either the center line or pivot axis of the articulating couplings between car units, a certain amount of slack must be provided to allow for negotiation of curves in a railroad track without causing undesired application of brakes. Slack must be provided as necessary at each truck when the manually-operable braking system is released.

The necessarily provided slack in such a manually-operable braking system needs to be taken up quickly during manual application of the brakes, but the same handbrake operating mechanism must, nevertheless, be capable of applying the brake shoes with ample force once the slack has been taken up, even though application of a large force by means of a linkage providing a mechanical advantage would appear to be at odds with the desired rapid take-up of slack.

Previously, numerous manually operable railroad car handbrake systems have provided allowances for relative movement between railroad car bodies and the trucks on which they are supported. Among these, most notable is the brake system disclosed in Morrison et al. U.S. Pat. No. 4,346,790, which discloses an arrangement for manual operation of brakes on an articulated multi-unit freight car, in which brake rods span the gaps between adjacent units of the car.

While the Morrison et al. patent discloses a brake system for articulated multi-unit cars, it makes no provision for rapid take up of the necessary amounts of slack in the linkages, with the result that considerable time may be spent taking up such slack before the braking system provides any braking effect. On the other hand, were the hand wheel or equivalent mechanism arranged to take up slack rapidly, the resultant amount of force which could be applied using the hand wheel might not be sufficient to apply the brake shoes to the wheels to provide sufficient braking effect, since the choice of greater distance moved results in a smaller force moving through that distance, for a given available amount of power, i.e., one brakeman's abilities.

What is needed, then, is an improved mechanical arrangement for manual operation of brakes for an articulated multi-unit rail car, which provides for reliable release of the brakes with a minimum of slack being created thereby, and by which it is possible manually to take up slack rapidly and thereafter to apply the brakes with ample force to the wheels of several trucks of the car from a single location of the car.

SUMMARY OF THE INVENTION

The present invention provides an improved handbrake operating mechanism for a multi-unit articulated railway car which overcomes the foregoing disadvantages of previously known hand brake operating mechanisms for such cars by providing for rapid take-up of slack in the linkages interconnecting the braking mechanisms for several trucks. The brake operating mechanism of the invention thereafter applies force with a greater mechanical advantage as the brake shoes are forced against the wheels of the railway car, in consequence of continued turning of a single hand wheel.

In accordance with the present invention, a hand wheel or equivalent mechanism is utilized to pull a chain or other flexible member carrying an idler block. The idler block pulls a connecting linkage which applies force to a lever which in turn applies the brake shoes to the wheels of the nearest truck, and simultaneously provides force to rotate a torque and motion transmitting element such as a take-up wheel connected to a handbrake linkage extending longitudinally of the car unit, providing mechanical force to apply the brakes of a more remote truck, first relatively rapidly taking up the slack which is necessarily provided in order to avoid inadvertent application of brakes, and thereafter, with an increased mechanical advantage, pulling the handbrake linkage a shorter distance for a given amount of rotation of the hand wheel, to apply greater force to the brake shoes on the wheels of the remote truck or trucks, as a result of continued application of similar force to the hand wheel. The rapid takeup of slack is accomplished by rotation of a noncircular or eccentrically mounted take-up wheel or spool, such as a sheave to which a flexible portion of the handbrake operating linkage is attached, to pull a longitudinal handbrake operating rod portion. The flexible portion is attached to the take-up wheel or sheave so that initial rotation of the take-up sheave is accomplished with the flexible portion acting through a relatively long effective lever arm about the axis of rotation of the sheave. Because of the noncircularity or eccentricity, the effective lever arm decreases as slack is taken up, thereby increasing the amount of force applied by the brake shoes against the wheels. For example, the take-up sheave may be eliptical and arranged in a position of rotation such that a chain is attached to it to be tangent the sheave where the major axis of the ellipse intersects its periphery when the handbrakes are in a released position, and the size of the take-up sheave such that the chain is tangent to the take-up sheave at about the point where the minor axis intersects the periphery, when the brake shoes have been applied and tightened into contact with the wheels of the trucks.

Preferably, additional noncircular or eccentric takeup wheels or sheaves similarly providing varying lever arm effective length are provided to take up slack rapidly from the linkages interconnecting more remote parts of the brake operating mechanism at the articulating couplings between car units, and thereafter to provide increased force in manually applying the brakes of more remote trucks.

In a preferred embodiment of the invention, a hand wheel is located at the B-end (the end where the handbrake wheel is located) of a B-unit (the unit carrying the handbrake operating control) of a multi-unit articulated car. A primary chain is connected to the spool of a winch, extending from the winch about a stationary idler block and carrying a movable pulley block attached to the free end of the primary take up chain. A secondary chain rove through the movable pulley block has one end attached to an intermediate lever arranged to move a brake lever of a truck brake mechanism, applying the brake shoes to the wheels of the No. 1 truck, nearest the hand wheel in response to application of tension by the hand wheel. The other part of the secondary chain extends around a large main sprocket or sheave fixedly mounted on a first transversely-extending rotatably mounted horizontal shaft, to which is attached an elliptical take-up wheel smaller than the main sprocket. Connected to the take-up wheel is a chain which forms one end of a longitudinal linkage extending along the B-unit of the multi-unit car.

The longitudinal linkage, from the torque and motion transmitting element located on this shaft, from the B end to the opposite, or A end of the B unit, where it is attached to a circular torque and motion transmitting element to rotate a second transverse horizontal shaft. The second transverse horizontal shaft extends at least to the longitudinal center line of the car, and, preferably has two additional circular, but larger, torque and motion transmitting members attached to the shaft, one being on the longitudinal center line of the car. The other motion transmitting member has a chain connected to it which extends to a vertical lever connected by linkage to a brake operating lever of a truck mounted brake mechanism, so that rotation of the transverse horizontal shaft in response to take up of the primary chain by the hand wheel results in application of the brakes on the wheels of the No. 2 truck. Located on the second horizontal transverse shaft as close as possible to the center line of the car is another, or fourth, torque and motion transmitting member.

A third transverse horizontal shaft is mounted rotatably in the B end of the adjacent C unit, and a torque and motion transmitting element of a size slightly smaller than the fourth torque and motion transmitting member is mounted as close as possible to center line of the car on that, third, shaft. A longitudinally extending interconnecting linkage (for example, an inter-unit brake rod and a pair of chain segments located at respective ends of the inter-unit brake rod) is attached to the respective torque and motion transmitting members located near or at center line of the car, so as to transmit motion from the second shaft to the third shaft.

Also fixedly mounted on the third transverse horizontal shaft for rotation therewith is another torque and motion transmitting member, preferably an eliptical sheave, and an interconnecting linkage extends longitudinally of the C unit to its A end, where a fourth transverse horizontal shaft is rotatably mounted. A circular torque and motion transmitting member is mounted concentrically on the fourth shaft to cause it to rotate in response to rotation of the third shaft in response to tension in the longitudinal handbrake linkage of the C unit. Another noncircular or eccentric torque and motion transmitting member is also mounted fixedly for rotation with the fourth shaft and is interconnected through linkage and levers to the brake mechanism mounted on the No. 3 truck, supporting the second articulating coupling, between the A end of the C-unit and the next adjacent car-unit's B end.

Each of the noncircular or eccentric torque and motion transmitting members is fastened to its respective shaft so as to present a minimum radial lever arm length to the attached linkage when the slack has been taken up to apply the brake shoes to the wheels, and to present the largest radius or effective lever arm length when beginning to take up the slack from the brakes-released condition.

It is therefore a principal object of the present invention to provide an improved handbrake mechanism for multi-unit articulated railway cars.

It is another important object of the present invention to provide a handbrake having the capability of manually applying the brakes on several trucks of a multi unit railway car rapidly yet forcefully.

It is an important feature of the present invention that it provides a nonuniform rate of movement of tension-carrying members of the brake-applying linkages in response to uniform movement of the brake-applying hand wheel or similar mechanism.

It is a further feature of the present invention that it provides a manual brake mechanism including inter-unit brake connecting linkages extending along the center line of the car above the inter-car pivot axes of the articulated multi-unit car.

An important advantage of the present invention is that it provides for more rapid simultaneous application of manually-actuated brakes on several trucks of a multi-unit articulated freight car than has previously been possible, in combination with the capability of applying adequate force for setting the brakes securely on several trucks by operation of a single hand wheel.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
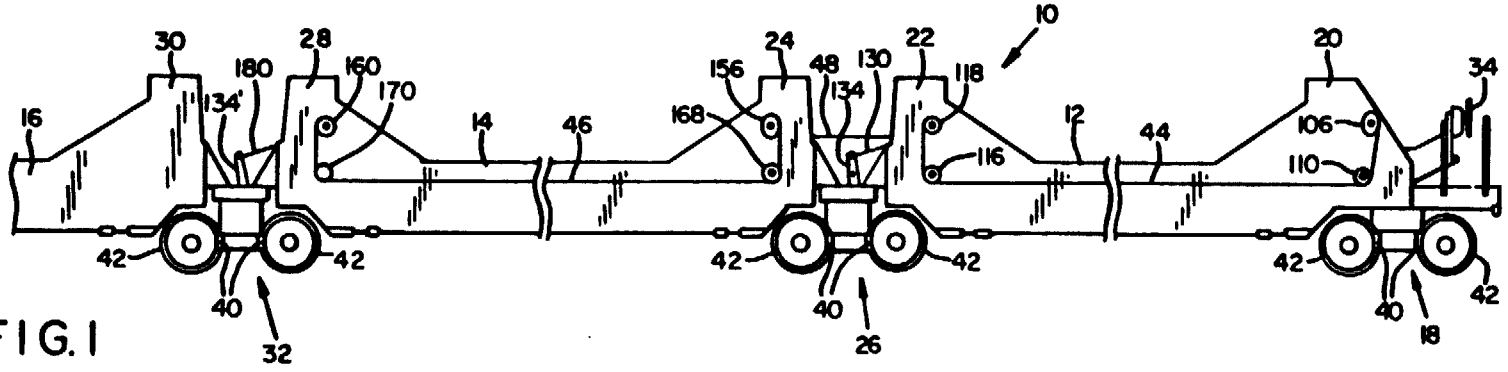
FIG. 1 is a side elevational schematic view of a portion of a multi-unit railway freight car including the manually operated brake system of the present invention.
Figure 2:
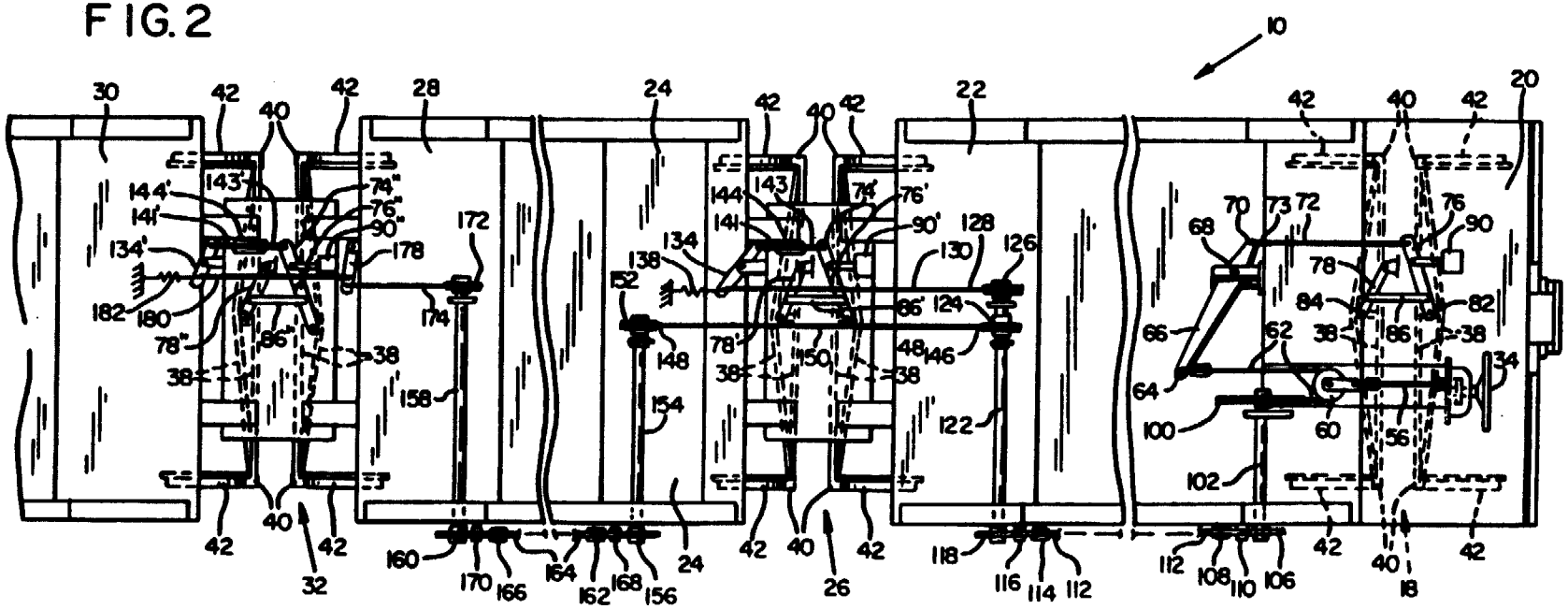
FIG. 2 is a top schematic view of the portion of a multi-unit freight car shown in FIG. 1.
Figure 3:
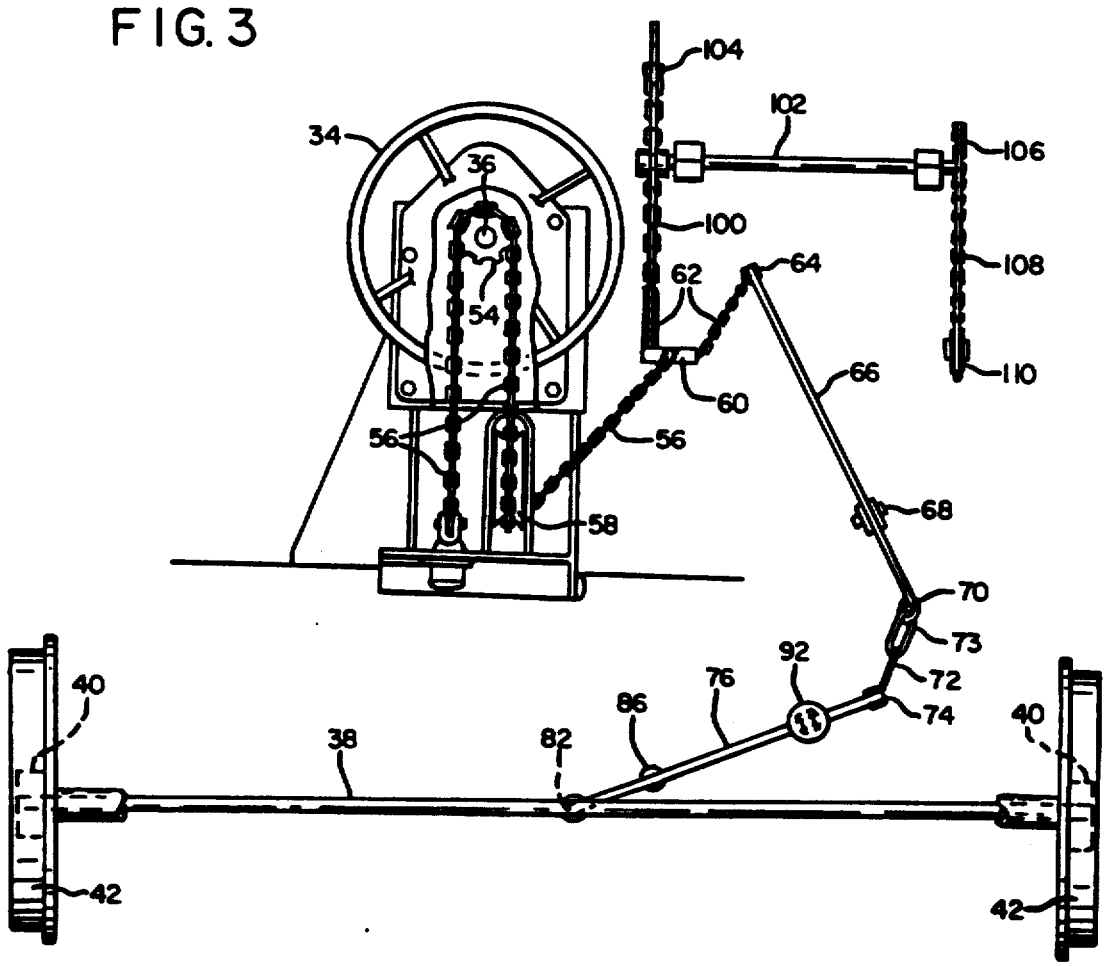
FIG. 3 is an end elevational schematic view of the B-end of the B-unit of the multi-unit freight car shown in FIGS. 1 and 2.

Referring now to the drawings, and in particular FIGS. 1-3, a multi-unit rail car 10, includes, for example, five units, of which 2½ units are shown: a "B" unit 12, a "C" unit 14, and an "D" unit 16. A No. 1 truck 18 supports the "B" end 20 of the B unit 12. The "A" end 22 of the B unit 12 is coupled to the "B" end 24 of the C unit 14 by an articulating coupling supported on the No. 2 truck 26. The "A" end 28 of the C unit 14 is coupled to the "B" end 30 of the D unit 16 by an articulating coupling supported on the No. 3 truck 32. The car 10 theoretically may be made up of three, four, or five, or perhaps even more units, although in practice such a car is typically limited to a total of five units. As a result, a five unit car will be carried on six trucks, half of which are shown in FIG. 1.

Since regulations effectively require the ability to apply brakes manually to half of the wheels of a railway car, the manual brake operating system of the present invention is arranged to apply brakes simultaneously to each of the wheels of the No. 1, No. 2, and No. 3 trucks 18, 26, and 32, by means of a vertical hand wheel 34 located above the safety platform at the B end of the car 10. The hand wheel 34 is mounted on a horizontal, longitudinally-extending hand wheel shaft 36 shown in FIGS. 4 and 5, and is connected through linkages, shafts, and levers which will be explained in greater detail subsequently to operate manually the truck-mounted brakes carried on each of the No. 1, No. 2 and No. 3 trucks 18, 26 and 32. The brakes mounted on each of the trucks 18, 26, and 32 are of conventional construction including a pair of brake beams 38, shown in FIG. 2, on each of the trucks 18, 26, and 32. Each of the brake beams 38 is equipped with a pair of brake shoes 40 of friction material. An arrangement of levers and linkages, which will be explained herein in greater detail, is provided to force the brake beams 38 toward the wheels 42 to bring the brake shoes 40 into frictional contact with respective ones of the wheels 42 of each truck 18, 26 or 32, in response to actuation of the air brake system connected throughout a train in which the car 10 may be included, or by action of the manual brake-operating system of the present invention.

Figure 4:
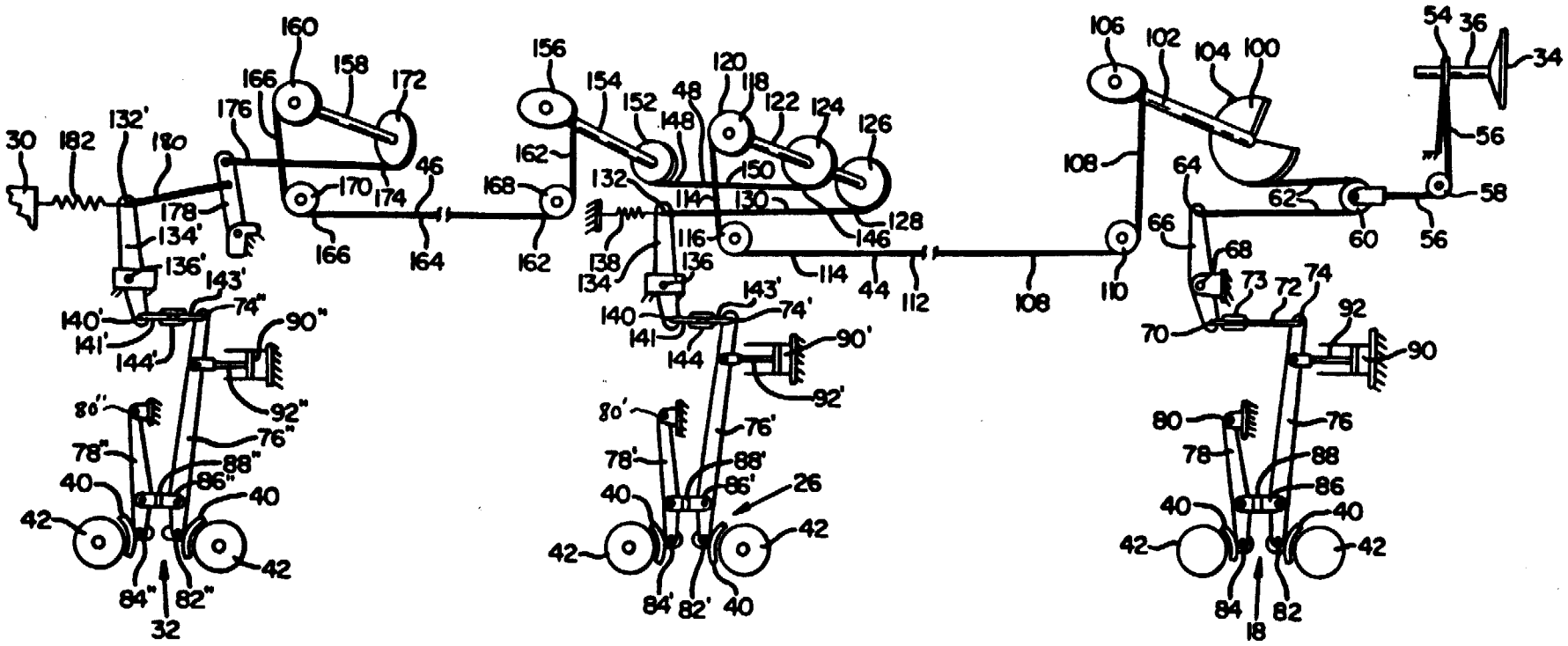
FIG. 4 is a diagrammatic view of the manually operated brake system for multi-unit railway cars according to the present invention, with the brakes in a released position.

In order manually to apply the brakes on all of the No. 1, No. 2 and No. 3 trucks 18, 26, and 32, the hand wheel 34 is arranged to apply mechanical force to the brake beams 38 through a system including longitudinal hand brake linkages 44 and 46 extending longitudinally along the left side of each of the B unit 12 and C unit 14, as well as a brake linkage 48 bridging the gap between the "A" end 22 of the B unit 12 and the "B" end 24 of the C unit 14, and brake rods 130 and 180 arranged to pull upon levers to operate the brakes on the No. 2 truck 26 and the No. 3 truck 32, respectively, as shown in FIGS. 1, 2 and 4 above.

Referring now to FIGS. 2, 3 and 4, it may be seen that the hand wheel shaft 36 is arranged to drive a gear assembly with an arcuate tensioner, e.g. geared sprocket 54, to which a primary chain 56 is engaged. A ratchet mechanism and a quick release mechanism may be used to interconnect the geared sprocket 54 drivingly with the hand wheel shaft 36 in a conventional manner, the details of which are not shown herein. The primary chain 56 extends over and downward from the geared sprocket 54 around an idler sprocket or pulley 58 mounted for rotation about an axis located fixedly with respect to the body of the B unit 12, the primary chain 56 extending thence rearward. A movable pulley block 60 is attached to the end of the primary chain 56 opposite the geared sprocket 54. A secondary chain 62 is rove through the movable pulley block 60 and has a first end attached to a first end 64 of a No. 1 truck intermediate brake lever 66 supported movably on a fulcrum bearing 68 mounted fixedly on the body of the B unit 12. The intermediate brake lever 66 extends transversely of the B unit 12 and slopes laterally downward from the first end 64 to the lower or second end 70, to which a connecting member such as a rod 72 is pivotably attached, by a slidably engaged long link 73. The rod 72 extends from the second end 70 of the intermediate lever 66 to the upper end 74 of the No. 1 truck brake mechanism operating lever 76, and the long link 73 is arranged to provide room for the upper end 74 to move toward the second end 70 of the lever 66.

The truck-mounted brake for each of the wheeled trucks 18, 26 and 32 may be, for example, of the type described in U.S. Pat. No. 4,312,428, and may be obtained from Ellcon-National, Inc., of Totowa, N.J. The brake mechanism includes a stationary brake lever 78 whose upper end 80 is pivotably supported by attachment to the truck 18. The lower ends 82 and 84 of levers 76 and 78, respectively, are pivotably attached to respective ones of the brake beams 38.

The ends 82 and 84 of the No. 1 truck brake operating lever 76 and the stationary brake lever 78 are pivotally connected each to a respective one of the brake beams 38. A reaction bar 86, including an automatic slack adjusting mechanism shown schematically at 88, interconnects the brake levers 76 and 78, with one end of the reaction bar 86 pivotally attached to each of the brake levers 76 and 78.

As shown in FIG. 4, an air brake cylinder and piston assembly 90 is fixedly mounted on the No. 1 truck 18, and a piston push rod 92 is attached at one end to the brake lever 76 with the opposite end free to float in the hollow rod of the piston thereby permitting the lever 76 to be moved in the direction required for applying the brakes without the actuation of the cylinder and piston assembly 90. The truck mounted brake for each of the trucks 26 and 32 is similar, and similar components thereof are indicated by primed or double primed reference numerals where appropriate.

The other part of the secondary chain 62 extending away from the movable pulley block 60 extends toward a wheel segment 100, which may be a sprocket or sheave, and which has a circular shape. The wheel segment 100 is concentrically mounted on a first transverse shaft 102, and the chain 62 extends around the bottom and upward about a portion of the perimeter of the wheel segment 100 which is facing toward the A end of the B unit 12 (clockwise in FIGS. 4 and 5), the end of the secondary chain 62 being fixedly attached to the wheel segment 100, as at 104. As seen in FIG. 4, the shaft 102 extends horizontally and transversely toward the left side of the car 10, and is rotatably supported on the body of the B unit 12. Fixedly attached to the end of the shaft 102 opposite the wheel segment 100 is an [eliptical or ] elliptical sheave 106, having, for example, a major diameter of 14 inches and perpendicular thereto a minor diameter of 12 inches. The outer end of a chain 108 which is an end portion of the longitudinal brake rod linkage 44 of the B unit 12 is fastened to the eliptical sheave 106. The chain 108 extends downwardly from the sheave 106, passing around an idler 110 rotatably mounted on the left side of the B end 20 of the B unit 12. The other end of the chain 108 is attached to a rod 112 which extends rearwardly and is slidably mounted on the left side of the B unit 12, extending toward the A end 22. A chain 114 has an end attached to the rod 112, and extends therefrom toward the A end 22, around an idler pulley 116 similar to the idler 110, and thence upward to a circular sheave 118, to which it is attached at 120. The circular sheave 118 is attached concentrically to an end of a second transverse shaft 122 rotatably supported by the body of the B unit 12 proximate the A end 22. The transverse shaft 122 extends away from the left side of the car 10, and has a circular sheave 124 fixedly mounted on the shaft 122 at the longitudinal center line of the car. A short distance laterally of the car along the shaft 122, another sheave 126 is also mounted fixedly on the shaft 122 for rotation therewith. The sheave 118 is, for example, 12 inches in diameter, while the sheaves 124 and 126 are somewhat larger and equal in size, for example, being 14 inches in diameter. A tension transmitting member such as a chain 128 connected to a brake rod 130, is attached to and extends around the bottom portion of the sheave 126, with the brake rod 130 at the opposite end of the chain 128 extending to the upper end 132 of a vertical brake lever 134 supported by a fulcrum pin located at 136 which is mounted on the No. 2 truck 25. A return spring 138 has an end attached to the upper end 132 and extends away from the brake rod 130, having its other end fastened to the B end 24 of the C unit 14, which is also supported by the No. 2 truck 26.

At the lower end 140 of the vertical brake lever 134 is secured to clevis 141 which is attached by a sliding long link 144 to clevis 143 which is secured to the upper end 74' of the movable brake lever 76' of the No. 2 truck 26. The sliding link 144 permits motion of the lever 74' toward the bottom end 140 for application of the brakes of the No. 2 truck 26 by the associated air pressure-operated cylinder and piston assembly 90'. Except for the differences of size required because of the No. 2 truck 26 being greater in capacity (because of having to support respective ends of two car units, instead of only one as in the truck 18) the brake mechanism of the No. 2 truck 26 is similar to that of the No. 1 truck 18 and has been, accordingly, shown with corresponding primed reference numerals where appropriate, and requires no further explanation.

Extending from the A end 22 to the B end 24 of the C unit 14 is an inter-unit brake linkage 48, which includes a flexible portion, such as a chain 146 at one end and a similar flexible portion such as a chain 148 at the opposite end, of a central portion such as a rod 150. The chain 146 has one end attached to the rod 150 and the opposite end is attached to the sheave 124, extending around the sheave in the same direction as does the chain 128 around the sheave 126. The chain 148 similarly extends around the bottom and upward along the far side of the periphery of a sheave 152, to which it is attached.

The sheave 152 is preferably a circular sheave of diameter similar to that of the sheave 118, and is located on the longitudinal center line of the car 10, concentrically mounted on a third transverse shaft 154. The shaft 154 is rotatably supported on the B end of the C unit 14 and extends laterally towards the left side of the car 10, where an eliptical sheave 156 is fixedly mounted on the shaft 154. The eliptical sheave 156 is preferably similar to the eliptical sheave 106. A fourth transverse shaft 158 is rotatably mounted at the A end 28 of the C unit 14 and carries a circular sheave 160 concentrically fixed to an end located at the left side of the car 10. The sheave 160 is preferably similar to the sheave 118. A longitudinal brake linkage 46 mentioned in connection with FIG. 1 is similar to the linkage 44, including a chain portion 162, a rod portion 164, and another chain portion 166 extending around respective idlers 168 and 170 located lower on the left side of the C unit 14. The chains 162 and 166 are attached, respectively, to the sheaves 156 and 160.

At the opposite end of the transverse shaft 158 from the sheave 160 is an eliptical sheave 172 which is similar to the sheaves 156 and 106. A flexible tension transmitting member such as a chain 174 has one end attached fixedly to the sheave 172 and extends around a portion of the sheave and thence beneath the sheave and is connected to a rod 176, whose opposite end is connected to the upper end of a power multiplying lever 178 whose lower end is pivotally attached to the A end 28 of the C unit 14. A short distance below the attachment of the rod 176 to the lever 178, for example, about 1/6 of the way toward the pivot axis of the lower end of the lever 178, a brake rod 180 is attached. The brake rod 180 extends to the upper end 132' of a vertical lever 134' supported at a fulcrum pin 136' mounted on the No. 3 truck 32. A return spring 182 extends from the upper end 132' to the B end 30 of the adjacent D unit 16, which is also supported by the No. 3 truck 32.

The brake mechanism on the No. 3 truck 32 is similar to that of the No. 2 truck 26, and similar components thereof are therefore indicated by primed or double primed reference numerals where appropriate, and need not be further described herein.

Figure 5:
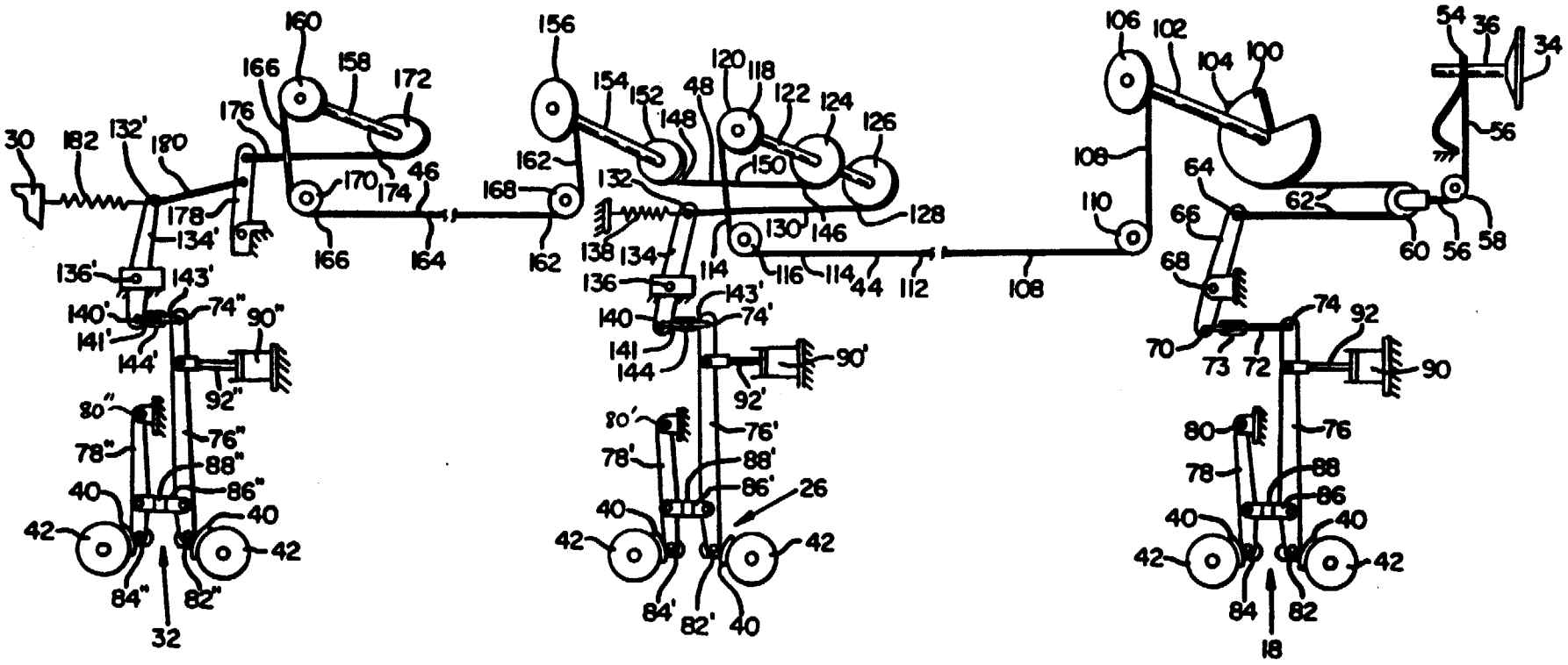
FIG. 5 is a diagrammatic view similar to that shown in FIG. 4, but showing the positions of the elements of the linkage with the brake shoes applied to the wheels of the respective trucks of the car by operation of the manually-operated brake system of the invention.

As shown in FIG. 4, the brake mechanism of the present invention is shown with the brake shoes 40 released from contact with the wheels 421. In this status each of the chains 108, 162, and 174 is tangent, respectively, to the eliptical sheave 106, 156, or 172 at a point where the distance from the axis of rotation of the respective shaft 102, 154 or 158 to the point of tangency o the sheave 106, 156, or 172, is a maximum. Thus, when the hand wheel 34 is rotated to pull the primary chain 56 and thus the secondary chain 62, the circular segment 100 is caused to rotate counterclockwise, thus taking up the chain 108 about the periphery of the sheave 106 at a maximum rate. Similarly, when this has caused sufficient tension in the longitudinal brake linkage 44 of the B unit 12, it will cause the shaft 122 to rotate counterclockwise as seen in FIGS. 4 and 5, creating tension in the brake rod 130 and thus moving the upper end 132 of the lever 134 and causing tension in the long link 144 to move the brake lever 74' and apply the brakes of the No. 2 truck 26. At the same time the sheave 124 is rotating counterclockwise creating tension in the inter-unit linkage 48 and causing the chain 148 to be pulled from the circular sheave 152, rotating the shaft 154 and thus rotating the sheave 156. When the sheave 156 is rotated it initially takes up any slack present in the longitudinal brake linkage 46 at a maximum rate, because of tangency of the chain 162 at the maximum distance from the axis of rotation of the shaft 154. Initial rotation of the sheave 156 is thus used to take up slack in the longitudinal linkage 46 of the C unit 14, until the transverse shaft 158 is initially rotated, causing the sheave 172 to commence rotation to take up slack in the linkage between the sheave 172 and the upper end 132' of the vertical lever 134' located on the No. 3 truck 32 and in a fashion similar to that descried above in connection with the initial rotation of the sheaves 156 and 106. It will be noted that the difference in diameters of the sheaves 124 and 126 from the diameter of the sheaves 118 and 152 and 160 makes possible the taking-up of a maximum amount of slack by a minimum amount of rotation of the transverse shaft 102.

Once the slack has initially been taken up by counterclockwise rotation of all of the shafts 158, 154, 122, and 102, as seen in FIGS. 4 and 5, the effective diameter at the point of tangency of the chains 174, 162, and 108 to their respective sheaves 172, 156, and 106 is less than the maximum, and by the time the brake shoes 40 are brought into braking contact against the wheels 42 the effective diameter of the sheaves 106, 156, and 172 is approaching its minimum, so that continued rotation of the hand wheel 34, causing application of tension to the secondary chain 62, applies tension to the levers 66, 134, and 1434', thus pulling on each of the brake operating levers 74, 74' and 74" to apply the brake shoes 40 to the wheels 42 of all of the No. 1, No. 2, and No. 3 trucks 18, 26, and 32, substantially simultaneously and with an increased amount of force as the result of the increased mechanical advantage derived from the minimum effective diameter of the sheaves 106, and 172 at that time, as shown in FIG. 5.

It will also be appreciated that since the vertical levers 134 and 134' are offset minimally from the center line of the respective No. 2 and No. 3 trucks 26 and 32, while the inter-unit connecting linkage 48 is located on center line of the car 10 when it is located on straight track, curving of the car will cause compensating slack in the linkage 48 while the car negotiates track curvature which would decrease the amount of slack in the linkages 176 and 150, and negotiation of a curve in the opposite direction will not cause sufficient additional slack in the linkages 176 and 150 to cause any problem.

It will be appreciated furthermore, that the transverse shafts 102, 122, 154, and 158, depending upon the amount of space available, might be mounted for rotation about respective vertical axes, so long as the interunit brake connecting linkage 48 can be placed on the longitudinal center line of the car between the B unit 12 and the C unit 14 and so long as the linkages 150 and 176 can be positioned at least relatively close to the longitudinal center line of the car 10.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a railroad freight car having a pair of wheeled trucks located respectively at opposite ends thereof and brakes arranged to apply brake shoes to respective wheels on each of said trucks, a manual brake operating mechanism for mechanically applying said brake shoes to respective wheels on each of said trucks with effective braking force, in response to operation of a single manual brake-operating device, comprising:

(a) first shaft means located proximate a first end of said railroad car for transmitting torque;

(b) an intermediate brake lever pivotably mounted on said car proximate said first end thereof, said intermediate brake lever having respective first and second lever ends, said first lever end being connected through linkage to a truck brake mechanism on a respective one of said wheeled trucks located at said first end of said car;

(c) manually operable means for rotating said first shaft means through a predetermined angle and simultaneously applying force to said second lever so as to pivot said intermediate brake lever in a direction required to apply said brake shoes to respective wheels on said one of said wheeled trucks located at said first end of said car;

(d) an arcuate tensioner mounted on said first shaft means for rotation therewith; and (e) first tension transmitting means extending longitudinally of said car and having a first end attached to said tensioner and a second end operatively connected through intermediate means to apply operative force for applying respective ones of said brake shoes to respective wheels of the one of said wheeled trucks located at the other of said opposite ends of said car, said tensioner being so shaped and located on said first shaft means that it provides an effective lever arm about said first shaft means and perpendicular to said tension transmitting means which varies in effective length between maximum effective length provided when said manually operable means is in a brake-releasing position and a minimum effective length provided when said manually operable means is operated so that said brake shoes are applied to said respective wheels of each of said wheeled trucks with effective braking force.

2. The brake system of claim 1 wherein said manually operable means includes a hand wheel, chain takeup means operable by said hand wheel, a first chain having an end thereof fastened to said takeup means, a first sheave mounted on said first shaft means for rotation therewith, a movable block connected to said second end of said first chain, and a second chain having an end thereof attached to said first sheave, a portion said second chain extending around and in contact with said first sheave, an intermediate portion thereof extending away from said first sheave and around said pulley block, and a second end of said second chain extending from said pulley block to said first lever end and being connected thereto, said hand wheel being arranged so that winding said first chain on said takeup means creates tension in said second chain tending to rotate said first shaft means and move said first lever end in said direction for applying said brake shoes to respective ones of said wheels of said first wheeled truck.

3. The brake system of claim 1, including second shaft means, located at said other one of said opposite ends of said car, said tension transmitting means being connected to rotate said second shaft means and said brake system including second tension transmitting means interconnecting said second shaft means and said brake assembly of said second wheeled truck.

4. In an articulated rail car having at least two car units and three wheeled trucks, a manually operable mechanical brake system, comprising:

(a) a respective brake assembly mounted on each of *at least three of* said trucks including a plurality of brake shoes and *manually operable* means for applying said brake shoes to respective wheels;

(b) first shaft means *for transmitting torque* rotatably supported on [said] *a first end of a* first car unit;

(c) *a* first car unit longitudinal brake tension transmitting assembly extending generally longitudinally of said first car unit;

(d) first arcuate means *mounted on said first shaft means* for applying tension to said first car unit longitudinal brake tension transmitting assembly, said first car unit longitudinal brake tension transmitting assembly being connected with said first arcuate means for applying tension;

(e) [a] second shaft means for transmitting torque rotatably mounted proximate [said] *a* second end of said first car unit for rotation with respect thereto;

(f) a pair of torque levers mounted on said second shaft means for rotation therewith;

(g) [a] second truck vertical-lever means for operating the respective brake assembly of [said] *a* second truck, pivotably mounted on said second truck;

(h) a second-truck brake rod assembly having a first end thereof operatively connected with said second truck vertical-lever means;

(i) third shaft means for transmitting torque, rotatably mounted on a first end of [said] *a* second *car* unit of said [multi unit] articulated *rail* car;

(j) a [first] *third* torque lever attached to said third shaft *means* for rotation therewith;

(k) an inter-unit tension transmitting linkage having opposite ends connected with respective ones of said torque levers located, respectively, on said second shaft means and third shaft means;

(l) means for applying tension to said second truck brake rod assembly, located on one of said second and third shaft means for rotation therewith and having an end of said second-truck brake rod assembly opposite said second-truck vertical-lever means attached thereto;

(m) [a] second arcuate means for applying tension, mounted on said third shaft means for rotation therewith;

(n) a second car unit longitudinal brake tension transmitting assembly supported on said second car unit and extending generally longitudinally thereof from said first end thereof toward said second end thereof;

(o) fourth shaft means for transmitting torque rotatably mounted on said second car unit proximate [said] *a* second end thereof;

(p) a fourth torque lever attached to said fourth shaft means for rotation therewith and having a second end of said second car unit longitudinal brake tension transmitting assembly attached thereto;

(q) third arcuate means for applying tension fixedly mounted on said fourth shaft means for rotation therewith;

(r) [a] third truck vertical-lever means for operating said brake assembly of [said] *a* third truck; and (s) means interconnecting said third arcuate means for applying tension [and] *with* said third truck vertical-lever means, for moving said third truck vertical-lever means in response to rotation of said fourth shaft means, each of said first, second, and third arcuate means for applying tension being so shaped and so located on the respective shaft means that it provides an effective lever arm about said respective shaft means and perpendicular to the respective one of said car unit longitudinal brake tension transmitting assemblies and said means interconnecting said third arcuate means for applying tension with said third truck brake assembly vertical-lever, which varies in effective length, between a maximum effective length provided when said manually operable means is in a brake-releasing position and a minimum effective length provided when said manually operable means is operated so that said brake shoes are applied to said respective wheels of each of said wheeled trucks with effective braking force.

5. The brake system of claim 4 wherein each of said arcuate means for applying tension comprises an elliptical torque plate defining a rim for receiving a chain extending along a peripheral rim portion thereof, each of said elliptical torque plates being fixedly mounted on the respective one of said shaft means symmetrically and in a position of rotation with respect to the respective one of said shaft means so that the respective tension-transmitting member is tangent to said rim at a point of minimum radius when said manually operated brake assembly is holding said shoes in contact with said wheels of said wheeled trucks with effective braking force.

6. The brake assembly of claim 4 wherein said inter-unit tension transmitting linkage extends longitudinally of said multi-unit car and is located substantially centrally with respect to the width of said multi-unit car.

7. The brake assembly of claim 4 wherein said third arcuate means for applying tension is an eliptical torque plate defining a rim for receiving a chain extending along a peripheral rim portion thereof, each of said eliptical torque plates being fixedly mounted on the respective one of said shaft means symmetrically and in a position of rotation with respect to the respective one of said shaft means so that the respective tension-transmitting member is tangent to said rim at a point of minimum radius when said manually operated brake assembly is holding said shoes in contact with said wheels of said wheeled trucks with effective braking force.

8. The brake assembly of claim 4 wherein said means interconnecting said third arcuate tensioning means and said third truck vertical lever means includes a force multiplier lever having an end thereof pivotably mounted on said second car unit proximate said second end thereof so as to exert a tension on said third truck vertical-lever means which is greater than the tension provided by said third arcuate means for applying tension.

[9. The brake assembly of claim 4 including vertical-lever means mounted on each of said second and third wheeled trucks for operating the respective brake assemblies of said second and third trucks.]

10. The brake assembly of claim 4 wherein said car has a side and said first shaft means extends substantially horizontally and transversely of said car, said first arcuate means for applying tension and said first car unit longitudinal brake tension transmitting assembly extend proximate said side of said car.

11. The brake assembly of claim 10 wherein each of said second, third, and fourth shaft means extend substantially horizontally and transversely of said car and said second car-unit longitudinal brake tension transmitting assembly extends longitudinally of said second car unit proximate said side of said car.

12. The brake assembly of claim 10 wherein said *torque levers mounted respectively on said* second and third shaft means *and connected with said inter-unit tension transmitting linkage* are located substantially centrally with respect to the width of said car and extend generally vertically.

13. The brake assembly of claim 4 including an intermediate brake lever pivotably mounted on said first car unit proximate said first end thereof, said intermediate brake lever having respective first and second lever ends, said first lever end being connected through linkage to said respective truck brake mechanism located on [said] *a* first wheeled truck, and said manually operable means including a hand wheel, sprocket means rotatable by said hand wheel, a first chain having a segment substantially at a first end thereof engaged with said sprocket means, a first sheave mounted on said first shaft means for rotation therewith, an idler block connected to a second end of said first chain, and a second chain having an end thereof attached to said first sheave, a portion thereof extending around and in contact with said first sheave, an intermediate portion thereof extending away from said first sheave and around said [pulley] *idler* block, and a second end of said second chain extending from said [pulley] *idler* block to said first lever end and being connected thereto, said hand wheel being arranged so that movement of said first chain on said sprocket means creates tension in said second chain tending to rotate said first shaft means and move said first lever end in said direction for applying said brake shoes to respective ones of said wheels of said first wheeled truck.

* * * * *

UNITED STATES PATENT AND TRADEMARK OFFICE

CERTIFICATE OF CORRECTION

PATENT NO. : Re. 34,040

DATED : August 25, 1992

INVENTOR(S) : Marvin G. Rains

It is certified that error appears in the above-indentified patent and that said Letters Patent is hereby corrected as shown below:

Col. 7, Line 43 Delete "truck 25" and insert --truck 26--.

Col. 8, Line 53 Delete "wheels 421" and insert --wheels 42--.

Line 57 After "tangency" delete "o" and insert --on--.

Col. 9, Line 17 Delete "descried" and insert --described--;

Line 35 Delete "1434'" and insert --134'--.

Col. 10, Line 23 After "second lever" insert --end--.

Signed and Sealed this

Twenty-eighth Day of December, 1993

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : Re. 34,040

DATED : August 25, 1992

INVENTOR(S) : Marvin G. Rains

It is certified that error appears in the above-identified patent and that said Letters Patent is hereby corrected as shown below:

Title page, item [57], col. 2,

In the Abstract:

| | | |
|---|---|---|
| | Line 13 | Delete "through" and insert --with--; |
| | | Delete "axis of rotation" and insert --radius--; |
| | Line 14 | Delete "through" and insert --with--; |
| | Line 15 | Delete "axis of rotation" and insert --radius--. |
| Col. 8, | Line 14 | Change "eliptical" to read --elliptical--; |
| | Line 15 | Change "eliptical" to read --elliptical--; |
| | Line 16 | Change "eliptical" to read --elliptical--; |
| | Line 29 | Change "eliptical" to read --elliptical--; |
| | Line 55 | Change "eliptical" to read --elliptical--. |

Signed and Sealed this

Nineteenth Day of July, 1994

*Attest:*

Bruce Lehman

BRUCE LEHMAN

*Attesting Officer*

*Commissioner of Patents and Trademarks*